United States Patent
Engdegard et al.

(10) Patent No.: US 9,094,754 B2
(45) Date of Patent: *Jul. 28, 2015

(54) REDUCTION OF SPURIOUS UNCORRELATION IN FM RADIO NOISE

(75) Inventors: Jonas Engdegard, Stockholm (SE); Heiko Purnhagen, Sundbyberg (SE); Leif Sehlstrom, Järfälla (SE)

(73) Assignee: Dolby International AB, Amsterdam (NL)

( * ) Notice: Subject to any disclaimer, the term of this patent is extended or adjusted under 35 U.S.C. 154(b) by 263 days.

This patent is subject to a terminal disclaimer.

(21) Appl. No.: 13/814,920

(22) PCT Filed: Aug. 16, 2011

(86) PCT No.: PCT/EP2011/064077
§ 371 (c)(1),
(2), (4) Date: Feb. 7, 2013

(87) PCT Pub. No.: WO2012/025429
PCT Pub. Date: Mar. 1, 2012

(65) Prior Publication Data
US 2013/0142339 A1    Jun. 6, 2013

Related U.S. Application Data

(60) Provisional application No. 61/376,567, filed on Aug. 24, 2010.

(51) Int. Cl.
*H04R 5/04* (2006.01)
*G10L 19/008* (2013.01)
(Continued)

(52) U.S. Cl.
CPC ............... *H04R 5/04* (2013.01); *G10L 19/008* (2013.01); *H04B 1/1676* (2013.01); *H04S 1/007* (2013.01)

(58) Field of Classification Search
CPC .......... H04R 5/04; G10L 19/008; H04S 1/007; H04B 1/1676
USPC .............. 381/2, 3, 17, 22, 113, 420; 455/296; 700/94; 704/500, 503; 345/419, 420; 375/328
See application file for complete search history.

(56) References Cited

U.S. PATENT DOCUMENTS 4,833,715 A * 5/1989 Sakai ............................. 381/17
5,027,402 A * 6/1991 Richards et al. ................ 381/10
(Continued)

FOREIGN PATENT DOCUMENTS

CN     101320562     12/2008
CN     101356573     1/2009
(Continued)

OTHER PUBLICATIONS

Purnhagen, H. "Low Complexity Parametric Stereo Coding in MPEG-4" Proc. of the International Conference on Digital Audioeffects, Oct. 5, 2004, pp. 163-168.
(Continued)

*Primary Examiner* — Gerald Gauthier

(57) ABSTRACT

The document relates to audio signal processing, in particular to a system and a corresponding method for improving an audio signal of an FM stereo radio receiver, in this context, one aspect relates to the estimation of noise in a received side signal and the compensation of such noise in parametric stereo parameters. A system for generating a parametric stereo parameter from a two-channel audio signal is described. The two-channel audio signal is presentable as a mid signal and side signal representative of a corresponding left and right audio signal. The system comprises a noise estimation stage configured to determine an impact factor characteristic for the noise of the side signal; and a parametric stereo parameter estimation stage configured to determine the parametric stereo parameter; wherein the determining is based on the two-channel audio signal and the impact factor.

20 Claims, 6 Drawing Sheets

(51) Int. Cl.
  *H04B 1/16* (2006.01)
  *H04S 1/00* (2006.01)

(56) References Cited

U.S. PATENT DOCUMENTS

| | | | | |
|---|---|---|---|---|
| 6,067,363 | A * | 5/2000 | Dent | 381/113 |
| 6,535,608 | B1 * | 3/2003 | Taira | 381/2 |
| 7,583,805 | B2 | 9/2009 | Baumgarte | |
| 7,734,473 | B2 * | 6/2010 | Schuijers et al. | 704/503 |
| 7,835,916 | B2 * | 11/2010 | Bruhn | 704/500 |
| 7,916,873 | B2 | 3/2011 | Villemoes | |
| 7,937,272 | B2 * | 5/2011 | Oomen et al. | 704/500 |
| 7,983,424 | B2 | 7/2011 | Kjoerling | |
| 7,983,922 | B2 * | 7/2011 | Neusinger et al. | 704/500 |
| 8,200,351 | B2 * | 6/2012 | Kurniawati et al. | 700/94 |
| 8,605,911 | B2 * | 12/2013 | Henn et al. | 381/22 |
| 8,737,626 | B2 * | 5/2014 | Kawashima | 381/17 |
| 8,929,558 | B2 * | 1/2015 | Engdegard et al. | 381/17 |
| 2005/0182996 | A1 | 8/2005 | Bruhn | |
| 2006/0171542 | A1 | 8/2006 | Den Brinker | |
| 2006/0246868 | A1 | 11/2006 | Taleb | |
| 2008/0199014 | A1 | 8/2008 | Kurniawati | |
| 2008/0212784 | A1 | 9/2008 | Szczerba | |
| 2009/0172060 | A1 | 7/2009 | Taleb | |
| 2009/0299734 | A1 | 12/2009 | Zhou | |
| 2012/0002818 | A1 * | 1/2012 | Heiko et al. | 381/22 |
| 2012/0207307 | A1 * | 8/2012 | Engdegard et al. | 381/3 |
| 2013/0142339 | A1 * | 6/2013 | Engdegard et al. | 381/17 |
| 2013/0142340 | A1 * | 6/2013 | Sehlstrom et al. | 381/17 |
| 2014/0226822 | A1 * | 8/2014 | Engdegard et al. | 381/3 |
| 2014/0235192 | A1 * | 8/2014 | Purnhagen et al. | 455/296 |

FOREIGN PATENT DOCUMENTS

| | | |
|---|---|---|
| CN | 101518103 | 8/2009 |
| CN | 101572088 | 11/2009 |
| JP | H08-046585 | 2/1996 |
| JP | 2009-010841 | 1/2009 |
| WO | 2012/025431 | 3/2012 |

OTHER PUBLICATIONS

ISO/IEC 23003-1:2007, Information Technology—MPEG Audio Technologies—Part 1: MPEG Surround, 2007.
ISO/IEC 14496-3:2005, Information Technology—Coding of Audio-Visual Objects—Part 3:Audio, 2005.
Baumgarte, F. et al. "Binaural Cue Coding—Part 1: Psychoacoustic Fundamentals and Design Principles" IEEE Transactions on Speech and Audio Processing, vol. 11, No. 6, Nov. 2003, pp. 509-519.
Faller, C. et al. "Binaural Cue Coding—Part II: Schemes and Applications" IEEE Transactions on Speech and Audio Processing, vol. 11, No. 6, Nov. 2003, pp. 520-531.

* cited by examiner

REDUCTION OF SPURIOUS UNCORRELATION IN FM RADIO NOISE

CROSS-REFERENCE TO RELATED APPLICATIONS

This application is the U.S. national stage of International Application PCT/EP2011/064077, filed 16 Aug. 2011, which in turn claims priority to U.S. Provisional Patent Application No. 61/376,567, filed 24 Aug. 2010, each of which are hereby incorporated by reference in its entirety.

TECHNICAL FIELD

The document relates to audio signal processing, in particular to a system and a corresponding method for improving an audio signal of an FM stereo radio receiver. In this context, one aspect relates to the estimation of noise in a received side signal and the compensation of such noise in parametric stereo parameters.

BACKGROUND OF THE INVENTION

In an analog FM (frequency modulation) stereo radio system, the left channel (L) and right channel (R) of the audio signal are conveyed in a mid-side (M/S) representation, i.e. as mid channel (M) and side channel (S). The mid channel M corresponds to a sum signal of L and R, e.g. M=(L+R)/2, and the side channel S corresponds to a difference signal of L and R, e.g. S=(L−R)/2. For transmission, the side channel S is modulated onto a 38 kHz suppressed carrier and added to the baseband mid signal M to form a backwards-compatible stereo multiplex signal. This multiplex signal is then used to modulate the HF (high frequency) carrier of the FM transmitter, typically operating in the range between 87.5 to 108 MHz.

When reception quality decreases (i.e. the signal-to-noise ratio over the radio channel decreases), the S channel typically suffers more than the M channel. In many FM receiver implementations, the S channel is muted when the reception conditions gets too noisy. This means that the receiver falls back from stereo to mono in case of a poor HF radio signal.

Even in case the mid signal M is of acceptable quality, the side signal S may be noisy and thus can severely degrade the overall audio quality when being mixed in the left and right channels of the output signal (which are derived e.g. according to L=M+S and R=M−S). When a side signal S has only poor to intermediate quality, there are two options: either the receiver chooses accepting the noise associated with the side signal S and outputs a real stereo signal comprising a noisy left and right signal, or the receiver drops the side signal S and falls back to mono.

Parametric Stereo (PS) coding is a technique from the field of very low bitrate audio coding. PS allows encoding a 2-channel stereo audio signal as a mono downmix signal in combination with additional PS side information, i.e. the PS parameters. The mono downmix signal is obtained as a combination of both channels of the stereo signal. The PS parameters enable the PS decoder to reconstruct a stereo signal from the mono downmix signal and the PS side information. Typically, the PS parameters are time and frequency-variant, and the PS processing in the PS decoder is typically carried out in a hybrid filterbank domain incorporating a QMF bank. The document "Low Complexity Parametric Stereo Coding in MPEG-4", Heiko Purnhagen, Proc. Digital Audio Effects Workshop (DAFx), pp. 163-168, Naples, IT, October 2004 describes an exemplary PS coding system for MPEG-4. Its discussion of parametric stereo is hereby incorporated by reference. Parametric stereo is supported e.g. by MPEG-4 Audio. Parametric stereo is discussed in section 8.6.4 and Annexes 8.A and 8.C of the MPEG-4 standardization document ISO/IEC 14496-3:2005 (MPEG-4 Audio, $3^{rd}$ edition). These parts of the standardization document are hereby incorporated by reference for all purposes. Parametric stereo is also used in the MPEG Surround standard (see document ISO/IEC 23003-1:2007, MPEG Surround). Also this document is hereby incorporated by reference for all purposes. Further examples of parametric stereo coding systems are discussed in the document "Binaural Cue Coding—Part I: Psychoacoustic Fundamentals and Design Principles," Frank Baumgarte and Christof Faller, IEEE Transactions on Speech and Audio Processing, vol 11, no 6, pages 509-519, November 2003, and in the document "Binaural Cue Coding—Part II: Schemes and Applications," Christof Faller and Frank Baumgarte, IEEE Transactions on Speech and Audio Processing, vol 11, no 6, pages 520-531, November 2003. In the latter two documents the term "binaural cue coding" is used, which is an example of parametric stereo coding.

In the present document, a method and system is described which is based on the generation of stereo signals using PS parameters. The PS parameters are used to generate a low noise stereo signal even when side signals of poor quality are received. In this context, the impact of noise in the side signal on the PS parameters is analyzed and a method is described, how such impact can be compensated.

SUMMARY OF THE INVENTION

According to an aspect, a system configured to generate an output stereo signal and/or configured to determine a parametric stereo parameter from a two channel audio signal is described. In other words, the system may be configured to determine at least one parametric stereo parameter. The two-channel audio signal may be received at an FM stereo radio receiver, which is e.g. part of a wireless communication device. The received two-channel audio signal may be presentable as a mid signal and a side signal. In other words, the two-channel audio signal may comprise a mid signal and a side signal or may comprise signals which are representable as a mid signal and a side signal. The mid signal and side signal may be representative of a corresponding left and right audio signal. The mid signal and the side signal may be derived from the left signal and the right signal. As such, the two-channel audio signal may comprise information from which a mid signal and a side signal can be derived. In an embodiment, the mid signal M and the side signal S relate to the left audio signal L and the right audio signal R, as M=(L+R)/2 and S=(L−R)/2.

The output stereo signal is typically representable of a left signal and a right signal. Alternatively, the output stereo signal may be referred to as a two-channel output signal. This two-channel output signal may carry a mono audio signal or a stereo audio signal. In particular, if the left signal of the two-channel output signal corresponds to the right signal of the two-channel output signal, the two-channel output signal usually carries a mono audio signal.

The system may comprise a noise estimation stage configured to determine an impact factor characteristic for the noise of the side signal. As outlined above, the side signal may be obtained from the received two-channel audio signal. In particular, the impact factor may be characteristic for the power spectrum of the side signal, e.g. of the power spectrum of a signal frame or a plurality of signal frames of the side signal. Even more particularly, the impact factor may be characteristic of the spectral flatness of the side signal. In an embodiment, the impact factor is derived from a spectral flatness measure of the side signal, e.g. from a spectral flatness measure of one or more signal frames of the side signal.

The system may comprise a parametric stereo parameter estimation stage configured to determine a parametric stereo parameter or at least one parametric stereo parameter. The parametric stereo parameter estimation stage may be configured to determine a parametric stereo parameter based on a signal frame of the two-channel audio signal. In other words, an excerpt of the received two-channel audio signal may be used to determine a parametric stereo parameter, e.g. a parameter indicating a channel level difference and/or a parameter indicating an inter-channel cross-correlation. In more general terms, the parametric stereo parameter estimation stage may be configured to determine a parametric stereo parameter which is indicative of the amount of decorrelation that is applied for the generation of the output stereo signal. The parametric stereo parameter estimation stage may be configured to determine a new parametric stereo parameter for each succeeding frame of the two-channel audio signal. Alternatively or in addition, the parametric stereo parameter estimation stage may be configured to determine the parametric stereo parameter based on, i.e. by taking into account, the impact factor. In an embodiment, the parametric stereo parameter comprises an inter-channel cross-correlation parameter indicative of the correlation between the left and right audio signal.

The parametric stereo parameter estimation stage may be configured to modify the noisy parametric stereo parameter such that the amount of decorrelation that is applied for the generation of a stereo signal is reduced, if the impact factor indicates a high degree of spectral flatness of the side signal. The parametric stereo parameter estimation stage may in particular determine the parametric stereo parameter from a function depending on the noisy parametric stereo parameter and the impact factor.

The system may comprise an upmix stage configured to generate the output stereo signal based on an auxiliary audio signal and the parametric stereo parameter. The auxiliary audio signal may be obtained from the two-channel audio signal. In particular, a frame of the auxiliary audio signal may be obtained from a corresponding frame of the two-channel audio signal. In an embodiment, the auxiliary audio signal is determined as (L+R)/a, wherein a is a real number, e.g. two. I.e. the auxiliary audio signal may correspond to the mid signal comprised within the two-channel audio signal.

The parametric stereo parameter estimation stage may be configured to determine a noisy inter-channel cross-correlation parameter using samples of a first signal frame of the left and right audio signal. In particular, a cross-correlation between a first signal frame of the left and of the right audio signal may be determined. This can be done by using e.g. the formulas outlined in this document. The inter-channel cross-correlation parameter may be determined by modifying the noisy inter-channel cross-correlation parameter using the impact factor. In particular, the noisy inter-channel cross-correlation parameter may be increased, if the impact factor indicates a high degree of spectral flatness of the side signal.

In other words, the parametric stereo parameter estimation stage may be configured to determine the inter-channel cross-correlation parameter from a function depending on the noisy inter-channel cross-correlation parameter and the impact factor. This function may have the value "0" if the impact factor value is "0". This function may have the value "1" if the impact factor value is "1". In between the values "0" and "1", the function may be continuous with regards to its variables "noisy inter-channel cross-correlation parameter" and "impact factor". The above constraints regarding the function are particularly relevant if the inter-channel cross-correlation parameter covers a range of "−1" to "1", wherein the inter-channel cross-correlation value "−1" indicates negative cross-correlation between the left and right channel, "0" indicates no cross-correlation between the left and right channel and wherein the inter-channel cross-correlation value "1" indicates full cross-correlation between the left and right channel. Furthermore, the impact factor may cover a range of "0" to "1", wherein the impact factor value "0" indicates a low degree of flatness and wherein the impact factor value "1" indicates a high degree of flatness.

In an embodiment, the parametric stereo parameter estimation stage may be configured to determine the inter-channel cross-correlation parameter ICC_new from the noisy inter-channel cross-correlation parameter ICC using the function: ICC_new=(impact factor)+(1−impact factor)*ICC.

The noise estimation stage may be configured to calculate a power spectrum of a second signal frame of the side signal. The first and second signal frames may coincide, i.e. the signal frame used to determine the noisy inter-channel cross-correlation parameter may correspond to the signal frame used to determine the power spectrum of the side signal. As indicated above, the power spectrum may be used to determine a spectral flatness of the side signal and thereby obtain an indication about the level of noise comprised within the side signal. The noise estimation stage may be configured to compensate a slope of the power spectrum, thereby yielding a compensated power spectrum. The slope used to compensate the power spectrum may be pre-determined, e.g. as the average slope of the power spectrum of a plurality of test side signals. These test side signals may be the side signals of mono signals, e.g. mono speech signals, thereby yielding a typical/average slope for the side signal noise comprised in mono signals, e.g. mono speech signals. Alternatively or in addition, the slope used to compensate the power spectrum may be determined using the second signal frame of the side signal. This could be done using linear regression techniques.

The noise estimation stage may be configured to determine a spectral flatness measure (SFM) value of the compensated power spectrum. The SFM value may be determined as the ratio between the geometric mean of the compensated power spectrum and the arithmetic mean of the compensated power spectrum. It should be noted that typically a plurality of SFM values is determined from and for a plurality of succeeding signal frames of the side signal. As the SFM values may be determined from and for current signal frames, they may be referred to as instantaneous SFM values. The noise estimation stage may be configured to map the SFM value (or the plurality of SFM values) and determine a first impact factor based on the mapped SFM value. The SFM value (or the plurality of SFM values) may be mapped onto a pre-determined scale or range in order to determine the first impact factor. In other words, the first impact factor may be determined from the SFM value. Consequently, a plurality of first impact factors may be determined from the plurality of SFM values.

As a result of the mapping, the first impact factor may be mapped to a range of "0" to "1". In particular, the noise estimation stage may be configured to set the first impact factor to "0" for an SFM value below a first lower threshold; and/or set the first impact factor to "1" for an SFM value above a first higher threshold; and/or scale an SFM value from the first lower threshold to the first higher threshold to the range "0" to "1", and to thereby map the SFM value, wherein the first impact value corresponds to the mapped SFM value. Linear scaling may be performed.

The noise estimation stage may be configured to determine a smoothed SFM value by taking into account a plurality of SFM values corresponding to a plurality of signal frames of the side signal. The smoothed SFM value may be determined recursively, e.g. by taking into account the SFM value of a current frame and the smoothed SFM value of a (directly) preceding frame. As such, a plurality of smoothed SFM values may be determined from and for a plurality of signal frames. In a similar manner to the SFM value, the smoothed SFM value may be mapped. In particular, the smoothed SFM value may be mapped onto a pre-determined scale or range. A second impact factor may be determined using the mapped smoothed SFM value. In other words, the second impact factor may be determined from the smoothed SFM value. Consequently, a plurality of second impact factors may be determined from the plurality of smoothed SFM values.

In a similar manner to the determination of the first impact factor, the noise estimation stage may be configured to map the second impact factor to a range of "0" to "1". The mapping may comprise the steps of setting the second impact factor to "0" for a smoothed SFM value below a second lower threshold; and/or setting the second impact factor to "1" for a smoothed SFM value above a second higher threshold; and/or scaling a smoothed SFM value from the first lower threshold to the first higher threshold to the range "0" to "1".

As a result, a first and second impact factor may be determined. Typically, the first impact value (or the plurality of first impact values) which is based on the instantaneous SFM value may be used to detect short noise bursts. The second impact value (or the plurality of second impact values) which is based on the smoothed SFM value may be used to detect static noise. In order to adapt the first and second impact values to their respective purpose, the first and second lower threshold and/or the first and second higher threshold may be set differently. In an embodiment, the first high threshold is higher than the second high threshold, in order to better detect short noise bursts.

The noise estimation stage may be configured to determine the impact factor based on the first and second impact factor. In an embodiment, the noise estimation stage is configured to select the larger one of the first and second impact factors as the impact factor. Alternatively, a weighted average of the first and second impact factors may be used as the impact factor.

The system may also comprise an audio encoder supporting parametric stereo, wherein the audio encoder may comprise a parametric stereo encoder, with the parametric stereo parameter estimation stage being part of the parametric stereo encoder. Alternatively or in addition, the system may be configured to detect that the FM stereo receiver selects mono output of the stereo radio signal or the system may be configured to detect poor radio reception. When the FM stereo receiver switches to mono output or poor radio reception occurs, the stereo upmix stage may use one or more upmix parameters which are based on one or more previously estimated parametric stereo parameters from the parametric stereo parameter estimation stage, such as inter-channel cross-correlation parameters.

According to a further aspect, an FM stereo radio receiver is described. The FM stereo radio receiver may be configured to receive an FM radio signal comprising or presentable as a mid signal and a side signal. Furthermore, the FM stereo radio receiver may comprise a system having any one or more of the features and functions outlined in the present document.

According to another aspect, a mobile communication device, e.g. a cellular telephone or a smart phone, is described. The mobile communication device may comprise an FM stereo receiver configured to receive an FM radio signal comprising or presentable as a mid signal and a side signal. Furthermore, the mobile communication device may comprise a system according to any one or more of the features and functions outlined in the present document.

According to a further aspect, a method for generating an output stereo signal and/or for determining a (or at least one) parametric stereo parameter from a two-channel audio signal is described. The two-channel audio signal may be presentable as or may comprise a mid signal and side signal, wherein the mid signal and the side signal may be representative of a corresponding left and right audio signal. The method may comprise the step of determining an impact factor characteristic for the noise, e.g. characteristic of the spectral flatness, of the side signal. The method may determine the parametric stereo parameter (or the at least one parametric stereo parameter), e.g. an inter-channel cross-correlation parameter indicative of the correlation between the left and right audio signal. The determining of the parametric stereo parameter may be based on the two-channel audio signal and the impact factor. The method may comprise the step of generating the output stereo signal based on an auxiliary audio signal and the parametric stereo parameter, wherein the auxiliary audio signal may be obtained from the two-channel audio signal.

According to a further aspect, a software program is described. The software program may be adapted for execution on a processor and for performing the method steps outlined in the present document when carried out on a computing device.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including their preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

DESCRIPTION OF DRAWINGS

The invention is explained below by way of illustrative examples with reference to the accompanying drawings, wherein.

DETAILED DESCRIPTION

Figure 1:
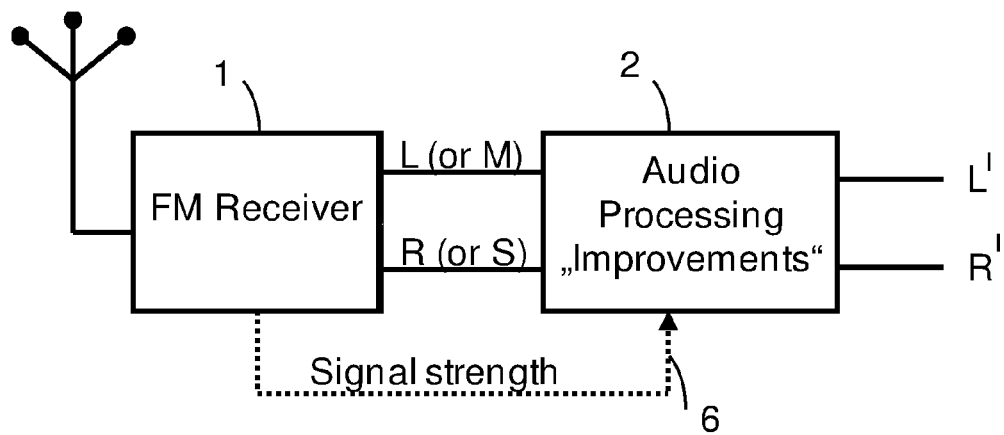
FIG. 1 illustrates a schematic embodiment for improving the stereo output of an FM stereo radio receiver.

FIG. 1 shows a simplified schematic embodiment for improving the stereo output of an FM stereo radio receiver 1. As discussed in the background section, in FM radio the stereo signal is transmitted by design as a mid signal and side signal. In the FM receiver 1, the side signal is used to create the stereo difference between the left channel L and the right channel R at the output of the FM receiver 1 (at least when reception is good enough and the side signal information is not muted). The left and right channels L, R may be digital or analog signals. For improving the audio signals L, R of the FM receiver, an audio processing apparatus 2 is used which generates a stereo audio signal L' and R' at its output. The audio processing apparatus 2 corresponds to a system which is enabled to perform noise reduction of a received FM radio signal using parametric stereo. The audio processing in the apparatus 2 is preferably performed in the digital domain; thus, in case of an analog interface between the FM receiver 1 and the audio processing apparatus 2, an analog-to-digital converter is used before digital audio processing in the apparatus 2. The FM receiver 1 and the audio processing apparatus 2 may be integrated on the same semiconductor chip or may be part of two semiconductor chips. The FM receiver 1 and the audio processing apparatus 2 can be part of a wireless communication device such as a cellular telephone, a personal digital assistant (PDA) or a smart phone. In this case, the FM receiver 1 may be part of the baseband chip having additional FM radio receiver functionality.

Instead of using a left/right representation at the output of the FM receiver 1 and the input of the apparatus 2, a mid/side representation may be used at the interface between the FM receiver 1 and the apparatus 2 (see M, S in FIG. 1 for the mid/side representation and L, R for the left/right representation). Such a mid/side representation at the interface between the FM receiver 1 and the apparatus 2 may result in less effort since the FM receiver 1 already receives a mid/side signal and the audio processing apparatus 2 may directly process the mid/side signal without downmixing. The mid/side representation may be advantageous if the FM receiver 1 is tightly integrated with the audio processing apparatus 2, in particular if the FM receiver 1 and the audio processing apparatus 2 are integrated on the same semiconductor chip.

Optionally, a signal strength signal 6 indicating the radio reception condition may be used for adapting the audio processing in the audio processing apparatus 2. This will be explained later in this specification.

The combination of the FM radio receiver 1 and the audio processing apparatus 2 corresponds to an FM radio receiver having an integrated noise reduction system.

Figure 2:
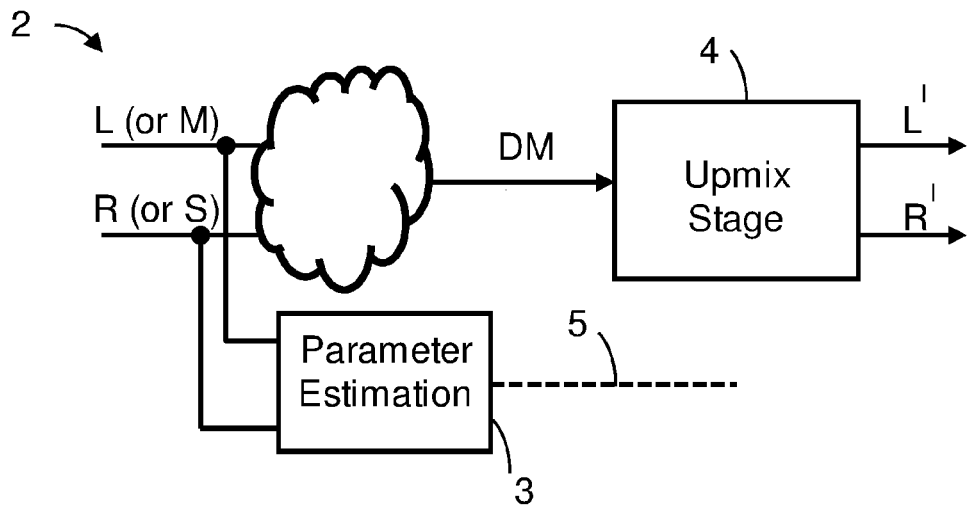
FIG. 2 illustrates an embodiment of the audio processing apparatus based on the concept of parametric stereo.

FIG. 2 shows an embodiment of the audio processing apparatus 2 which is based on the concept of parametric stereo. The apparatus 2 comprises a PS parameter estimation stage 3. The parameter estimation stage 3 is configured to determine PS parameters 5 based on the input audio signal to be improved (which may be either in left/right or mid/side representation). The PS parameters 5 may include, amongst others, a parameter indicating inter-channel intensity differences (IID or also called CLD—channel level differences) and/or a parameter indicating an inter-channel cross-correlation (ICC). Preferably, the PS parameters 5 are time- and frequency-variant. In case of an M/S representation at the input of the parameter estimation stage 3, the parameter estimation stage 3 may nevertheless determine PS parameters 5 which relate to the L/R channels.

An audio signal DM is obtained from the input signal. In case the input audio signal uses already a mid/side representation, the audio signal DM may directly correspond to the mid signal. In case the input audio signal has a left/right representation, the audio signal is generated by downmixing the audio signal. Preferably, the resulting signal DM after downmix corresponds to the mid signal M and may be generated by the following equation:

$$DM=(L+R)/a, \text{ e.g. with } a=2,$$

i.e. the downmix signal DM may correspond to the average of the L and R signals. For different values of a, the average of the L and R signals is amplified or attenuated.

The apparatus further comprises an upmix stage 4 also called stereo mixing module or stereo upmixer. The upmix stage 4 is configured to generate a stereo signal L', R' based on the audio signal DM and the PS parameters 5. Preferably, the upmix stage 4 does not only use the DM signal but also uses a side signal or some kind of pseudo side signal (not shown). This will be explained later in the specification in connection with more extended embodiments in FIGS. 4 and 5.

The apparatus 2 is based on the idea that due to its noise the received side signal may be too noisy for reconstructing the stereo signal by simply combining the received mid and side signals; nevertheless, in this case the side signal or side signal's component in the L/R signal may be still good enough for stereo parameter analysis in the PS parameter estimation stage 3. The resulting PS parameters 5 can be then used for generating a stereo signal L', R' having a reduced level of noise in comparison to the audio signal directly at the output of the FM receiver 1.

Thus, a bad FM radio signal can be "cleaned-up" by using the parametric stereo concept. The major part of the distortion and noise in an FM radio signal is located in the side channel which may be not used in the PS downmix. Nevertheless, the side channel is, even in case of bad reception, often of sufficient quality for PS parameter extraction.

In all the following drawings, the input signal to the audio processing apparatus 2 is a left/right stereo signal. With minor modifications to some modules within the audio processing apparatus 2, the audio processing apparatus 2 can also process an input signal in mid/side representation. Therefore, the concepts discussed herein can be used in connection with an input signal in mid/side representation.

Figure 3:
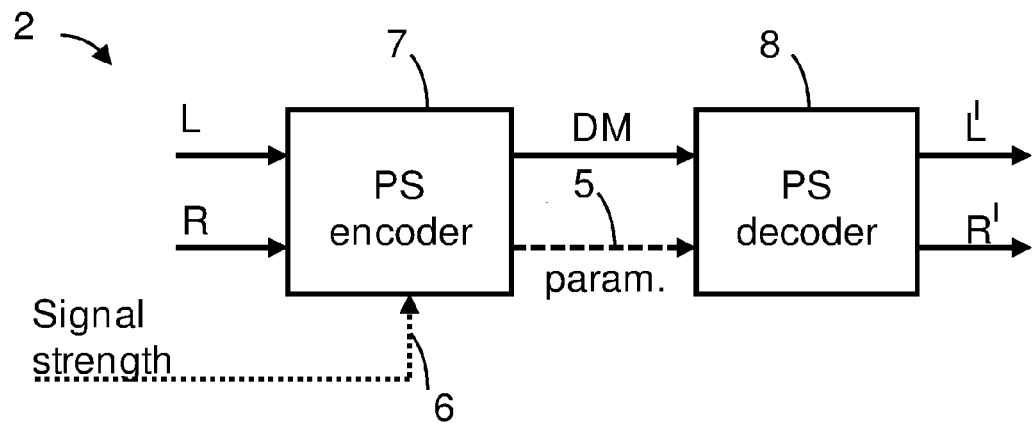
FIG. 3 illustrates another embodiment of the PS based audio processing apparatus having a PS encoder and a PS decoder.

FIG. 3 shows an embodiment of the PS based audio processing apparatus 2, which makes use of a PS encoder 7 and a PS decoder 8. The parameter estimation stage 3, in this example, is part of the PS encoder 7 and the upmix stage 4 is part of the PS decoder 8. The terms "PS encoder" and "PS decoder" are used as names for describing the function of the audio processing blocks within the apparatus 2. It should be noted that the audio processing is all happening at the same FM receiver device. These PS encoding and PS decoding processes may be tightly coupled and the terms "PS encoding" and "PS decoding" are only used to describe the heritage of the audio processing functions.

The PS encoder 7 generates—based on the stereo audio input signal L, R—the audio signal DM and the PS parameters 5. Optionally, the PS encoder 7 further uses a signal strength signal 6. The audio signal DM is a mono downmix and preferably corresponds to the received mid signal. When summing the L/R channels to form the DM signal, the information of the received side channel may be completely excluded in the DM signal. Thus, in this case only the mid information is contained in the mono downmix DM. Hence, any noise from the side channel may be excluded in the DM signal. However, the side channel is part of the stereo parameter analysis in the encoder 7 as the encoder 7 typically takes L=M+S and R=M−S as input (consequently, DM=(L+R)/2=M).

The mono signal DM and the PS parameters 5 are subsequently used in the PS decoder 8 to reconstruct the stereo signal L', R'.

Figure 4:
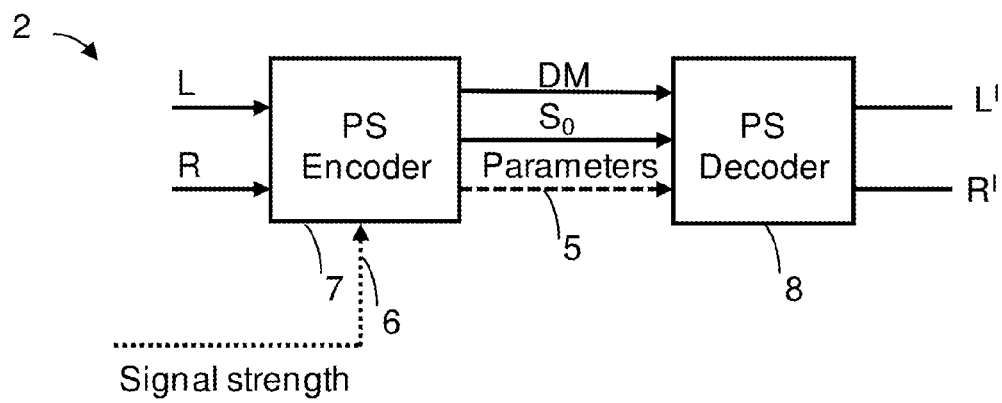
FIG. 4 illustrates an extended version of the audio processing apparatus of FIG. 3.

FIG. 4 shows an extended version of the audio processing apparatus 2 of FIG. 3. Here, in addition to the mono downmix signal DM and the PS parameters also the originally received side signal $S_O$ is passed on to the PS decoder 8. This approach is similar to "residual coding" techniques from PS coding, and allows to make use of at least parts (e.g. certain frequency bands) of the received side signal $S_O$ in case of good but not perfect reception conditions. The received side signal $S_O$ is preferably used in case the mono downmix signal corresponds to the mid signal. However, in case the mono downmix signal does not correspond to the mid signal, a more generic residual signal can be used instead of the received side signal $S_O$. Such a residual signal indicates the error associated with representing original channels by their downmix and PS parameters and is often used in PS encoding schemes. In the following, the remarks to the use of the received side signal $S_O$ apply also to a residual signal.

Figure 5:
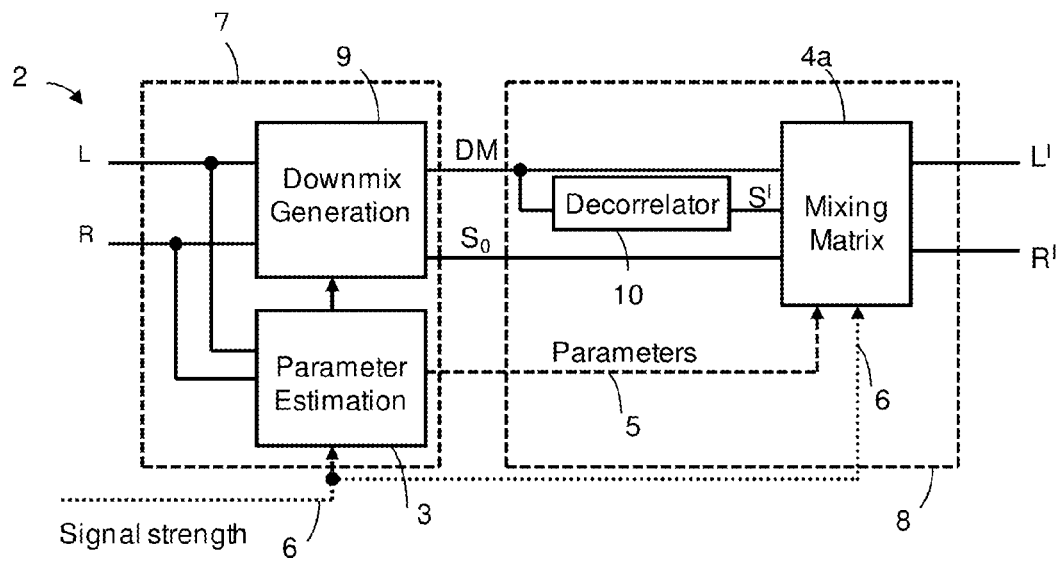
FIG. 5 illustrates an embodiment of the PS encoder and the PS decoder of FIG. 4.

FIG. 5 shows an embodiment of the PS encoder 7 and the PS decoder 8 of FIG. 4. The PS encoder module 7 comprises a downmix generator 9 and a PS parameter estimation stage 3. E.g. the downmix generator 9 may create a mono downmix DM which preferably corresponds to a mid signal M (e.g. DM=M=(L+R)/a) and may optionally also generate a second signal which corresponds to the received side signal $S_O$=(L−R)/a.

The PS parameter estimation stage 3 may estimate as PS parameters 5 the correlation and the level difference between the L and R inputs. Optionally, the parameter estimation stage receives the signal strength 6, which may be the signal power at the FM receiver. This information can be used to decide about the reliability of the PS parameters 5. In case of a low reliability, e.g. in case of a low signal strength 6, the PS parameters 5 may be set such that the output signal L', R' is a mono output signal or a pseudo stereo output signal. In case of a mono output signal, the output signal L' is equal to the output signal R'. In case of a pseudo stereo output signal, default PS parameters may be used to generate a pseudo or default stereo output signal L', R'.

The PS decoder module 8 comprises a stereo mixing matrix 4a and a decorrelator 10. The decorrelator receives the mono downmix DM and generates a decorrelated signal S' which is used as a pseudo side signal. The decorrelator 10 may be realized by an appropriate all-pass filter as discussed in section 4 of the cited document "Low Complexity Parametric Stereo Coding in MPEG-4". The stereo mixing matrix 4a is a 2×2 upmix matrix in this embodiment.

Dependent upon the estimated parameters 5, the stereo mixing matrix 4a mixes the DM signal with the received side signal $S_O$ or the decorrelated signal S' to create the stereo output signals L' and R'. The selection between the signal $S_O$ and the signal S' may depend on a radio reception indicator indicative of the reception conditions, such as the signal strength 6. One may instead or in addition use a quality indicator indicative of the quality of the received side signal. One example of such a quality indicator may be an estimated noise (power) of the received side signal. In case of a side signal comprising a high degree of noise, the decorrelated signal S' may be used to create the stereo output signal L' and R', whereas in low noise situations, the side signal $S_O$ may be used. Various embodiments for estimating the noise of the received side signal are discussed later in this specification.

The upmix operation is preferably carried out according to the following matrix equation:

$$\begin{pmatrix} L' \\ R' \end{pmatrix} = \begin{pmatrix} \alpha & \beta \\ \gamma & \delta \end{pmatrix} \begin{pmatrix} DM \\ S \end{pmatrix}$$

Here, the weighting factors $\alpha, \beta, \gamma, \delta$ determine the weighting of the signals DM and S. The mono downmix DM preferably corresponds to the received mid signal. The signal S in the formula corresponds either to the decorrelated signal S' or to the received side signal $S_O$. The upmix matrix elements, i.e. the weighting factors $\alpha, \beta, \gamma, \delta$, may be derived e.g. as shown the cited paper "Low Complexity Parametric Stereo Coding in MPEG-4" (see section 2.2), as shown in the cited MPEG-4 standardization document ISO/IEC 14496-3:2005 (see section 8.6.4.6.2) or as shown in MPEG Surround specification document ISO/IEC 23003-1 (see section 6.5.3.2). These sections of the documents (and also sections referred to in these sections) are hereby incorporated by reference for all purposes.

In certain reception conditions, the FM receiver 1 only provides a mono signal, with the conveyed side signal being muted. This will typically happen when the reception conditions are very bad and the side signal is very noisy. In case the FM stereo receiver 1 has switched to mono playback of the stereo radio signal, the upmix stage preferably uses upmix parameters for blind upmix, such as preset upmix parameters, and generates a pseudo stereo signal, i.e. the upmix stage generates a stereo signal using the upmix parameters for blind upmix.

There are also embodiments of the FM stereo receiver 1 which switch, at too poor reception conditions, to mono playback. If the reception conditions are too poor for estimation of reliable PS parameters 5, the upmix stage preferably uses upmix parameters for blind upmix and generates a pseudo stereo signal based thereon.

Figure 6:
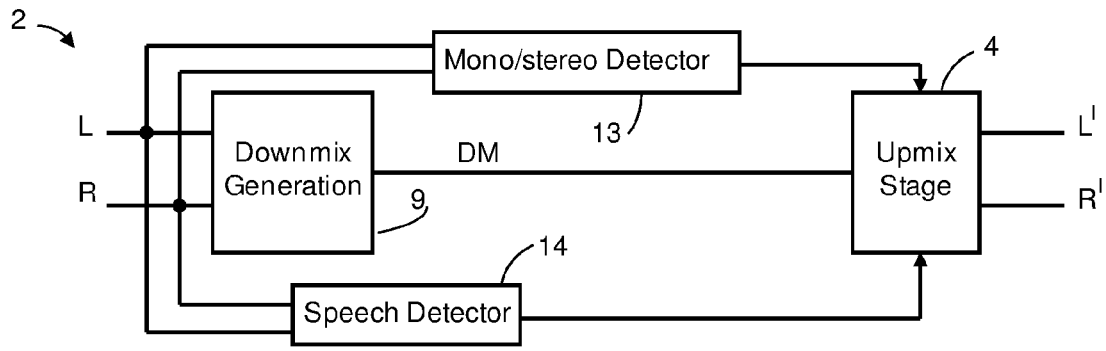
FIG. 6 illustrates another embodiment of the audio processing apparatus for pseudo-stereo generation in case of mono only output of the FM receiver.

FIG. 6 shows an embodiment for the pseudo-stereo generation in case of mono only output of the FM receiver 1. Here, a mono/stereo detector 13 is used to detect whether the input signal to the apparatus 2 is mono, i.e. whether the signals of the L and R channels are the same. In case of mono playback of the FM receiver 1, the mono/stereo detector 13 indicates to upmix to stereo using e.g. a PS decoder with fixed upmix parameters. In other words: in this case, the upmix stage 4 does not use PS parameters from the PS parameter estimation stage 3 (not shown in FIG. 6), but uses fixed upmix parameters (not shown in FIG. 6).

Optionally, a speech detector 14 may be added to indicate if the received signal is predominantly speech or music. Such speech detector 14 allows for signal dependent blind upmix. E.g. such a speech detector 14 may allow for signal dependent upmix parameters. Preferably, one or more upmix parameters may be used for speech and different one or more upmix parameters may be used for music. Such a speech detector 14 may be realized by a Voice Activity Detector (VAD).

Strictly speaking, the upmix stage 4 in FIG. 6 comprises a decorrelator 10, a 2×2 upmix matrix 4a, and means to convert the output of the mono/stereo detector 13 and the speech detector 14 into some form of PS parameters used as input to the actual stereo upmix.

Figure 7:
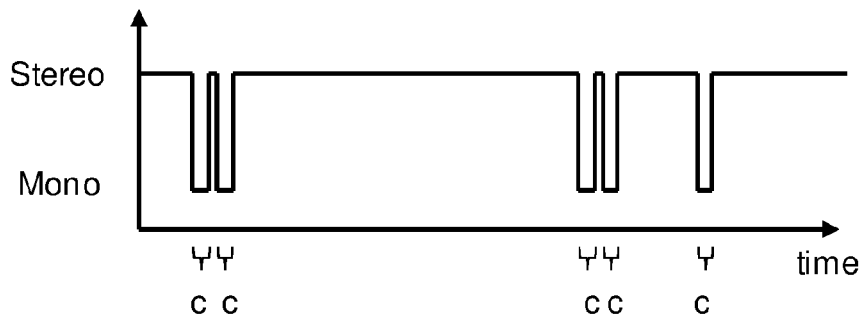
FIG. 7 illustrates the occurrence of short drop-outs in stereo playback at the output of the FM receiver.

FIG. 7 illustrates a common problem when the audio signal provided by the FM receiver 1 toggles between stereo and mono due to time-variant bad reception conditions (e.g. "fading"). To maintain a stereo sound image during mono/stereo toggling, error concealment techniques may be used. Time intervals where concealment shall be applied are indicated by "C" in FIG. 7. An approach to concealment in PS coding is to use upmix parameters which are based on the previously estimated PS parameters in case that new PS parameters cannot be computed because the audio output of the FM receiver 1 dropped down to mono. E.g. the upmix stage 4 may continue to use the previously estimated PS parameters in case that new PS parameters cannot be computed because the audio output of the FM receiver 1 dropped down to mono. Thus, when the FM stereo receiver 1 switches to mono audio output, the stereo upmix stage 4 continues to use the previously estimated PS parameters from the PS parameter estimation stage 3. If the dropout periods in the stereo output are short enough so that the stereo sound image of the FM radio signal remains similar during a dropout period, the dropout is not audible or only scarcely audible in the audio output of the apparatus 2. Another approach may be to interpolate and/or extrapolate upmix parameters from previously estimated parameters. With respect to determination of upmix parameters based on the previously estimated PS parameters, one may in light of the teachings herein, also use other techniques known e.g. from error concealment mechanisms that can be used in audio decoders to mitigate the effect of transmission errors (e.g. corrupt or missing data).

The same approach of using upmix parameters based on the previously estimated PS parameters can be also applied if the FM receiver 1 provides a noisy stereo signal during a short period of time, with the noisy stereo signal being too bad to estimate reliable PS parameters based thereon.

In the following, an advanced PS parameter estimation stage 3' providing error compensation is discussed with reference to FIG. 8. In case of estimating PS parameters based on a stereo signal containing a noisy side component, there will be an error in the calculation of the PS parameters if conventional formulas for determining the PS parameters are used, such as for determining the CLD parameter (Channel Level Differences) and the ICC parameter (Inter-channel Cross-Correlation).

Figure 8:
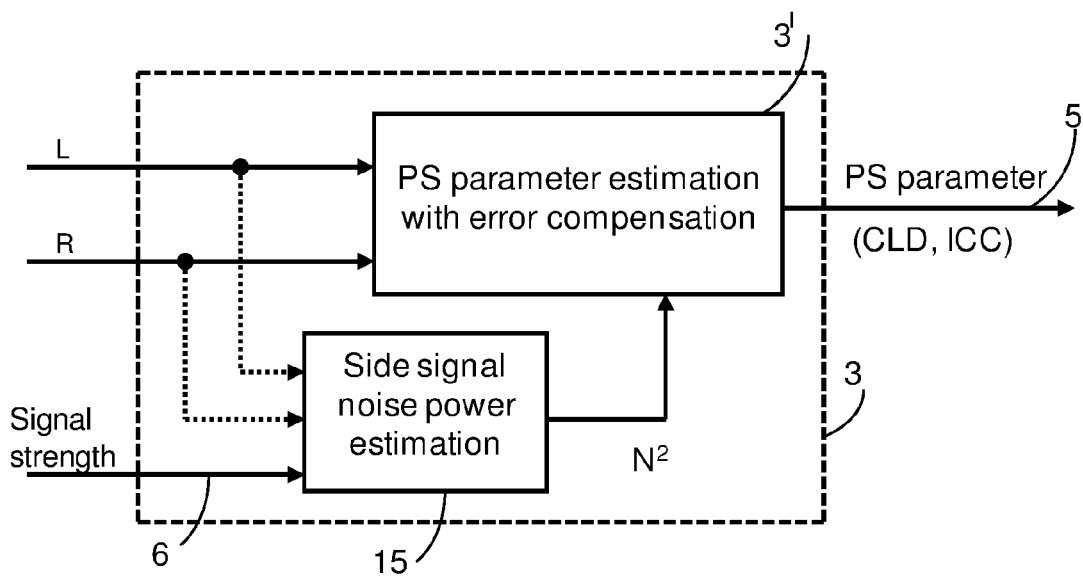
FIG. 8 illustrates an advanced PS parameter estimation stage with error compensation.

The actual noisy stereo input signal values $l_{w/noise}$ and $r_{w/noise}$, which are input to the inner PS parameter estimation stage 3' shown in FIG. 8, can be expressed in dependency of the respective values $l_{w/onoise}$ and $r_{w/onoise}$ without noise and the noise values n of the received side signal values:

$$l_{w/noise}=m+(s+n)=l_{w/onoise}+n$$

$$r_{w/noise}=m-(s+n)=r_{w/onoise}-n$$

It should be noted that here the received side signal is modeled as s+n, where "s" is the original (undistorted) side signal, and "n" is the noise (distortion signal) caused by the radio transmission channel. Furthermore, it is assumed here that the signal m is not distorted by noise from the radio transmission channel.

Thus, the corresponding input powers $L_{w/noise}^2$, $R_{w/noise}^2$ and the cross correlation $L_{w/noise}R_{w/noise}$ can be written as:

$$L_{w/noise}^2=E(l_{w/noise}^2)=E((m+s)^2)+E(n^2)=L_{w/onoise}^2+N^2$$

$$R_{w/noise}^2=E(r_{w/noise}^2)=E((m-s)^2)+E(n^2)=R_{w/onoise}^2+N^2$$

$$L_{w/noise}R_{w/noise}=E(l_{w/noise} \cdot r_{w/noise})=E((l_{w/onoise}+n)\cdot(r_{w/onoise}-n))=L_{w/onoise}R_{w/onoise}-N^2$$

With the side signal noise power estimate $N^2$, with $N^2=E(n^2)$, where "E( )" is the expectation operator.

By rearranging the above equations, the corresponding compensated powers and cross-correlation without noise can be determined to be:

$$L_{w/onoise}^2=L_{w/noise}^2-N^2$$

$$R_{w/onoise}^2=R_{w/noise}^2-N^2$$

$$L_{w/onoise}R_{w/onoise}=L_{w/noise}R_{w/noise}+N^2$$

An error-compensated PS parameter extraction based on the compensated powers and cross correlation may be carried out as given by the formulas below:

$$CLD=10 \cdot \log(L_{w/onoise}^2/R_{w/onoise}^2)$$

$$ICC=(L_{w/onoise}R_{w/onoise})/(L_{w/onoise}^2+R_{w/onoise}^2)$$

Such a parameter extraction compensates for the estimated $N^2$ term in the calculation of the PS parameters.

The effect of noise in the side signal is as follows: When assuming that the noise in the side signal is independent of the mid signal:
 the ICC values get closer to 0 in comparison to the ICC values estimated based on a noiseless stereo signal, and
 the CLD values in decibel get closer to 0 dB in comparison to the CLD values estimated based on a noiseless stereo signal.

For compensation of the error in the PS parameters, the apparatus 2 preferably has a noise estimate stage which is configured to determine a noise parameter characteristic for the power of the noise of the received side signal that was caused by the (bad) radio transmission. The noise parameter may then be considered when estimating the PS parameters. This may be implemented as shown in FIG. 8.

According to FIG. 8, the FM signal strength 6 may be used for at least partly compensating the error. Information on the signal strength is often available in FM radio receivers. The signal strength 6 is input to the parameter analyzing stage 3 in the PS encoder 7. In a side signal noise power estimation stage 15, the signal strength 6 may be converted to the side signal noise power estimate $N^2$. As an alternative to the signal strength 6 or in addition to the signal strength 6, the audio signal L, R may be used for estimating the signal noise power as will be discussed later on.

In FIG. 8, the side signal noise power estimation stage 15 is configured to derive the noise power estimate $N^2$ based on the signal strength 6 and/or the audio input signals (L and R). The noise power estimate $N^2$ can be both frequency-variant and time-variant.

A variety of methods can be used for determining the side signal noise power $N^2$, e.g.:
 When detecting power minima of the mid signal (e.g. pauses in speech), it can be assumed that the power of the side signal is noise only (i.e. the power of the side signal corresponds to $N^2$ in these situations).

The $N^2$ estimate can be defined by a function of the signal strength data 6. The function (or lookup table) can be designed by experimental (physical) measurements.

The $N^2$ estimate can be defined by a function of the signal strength data 6 and/or the audio input signals (L and R). The function can be designed by heuristic rules.

The $N^2$ estimate can be based on studying the signal type coherence of the mid and side signals. The original mid and side signals can e.g. be assumed to have similar tonality-to-noise ratio or crest factor or other power envelope characteristics. Deviations of those properties can be used to indicate a high level of $N^2$.

In the following, an embodiment of a side signal noise power estimation stage 15 and a PS parameter estimation stage with error compensation 3' is described. As already indicated, the addition of (independent) noise in the side channel leads to errors in the estimation of the PS parameters. The consequences are that:

a) The magnitude of the CLD values will typically decrease (towards 0 dB). Hence, the re-generated stereo signal tends to be panned more towards the center.

b) The ICC values decrease (towards 0, i.e. towards decorrelation). Hence, a higher degree of artificially generated decorrelation is used for re-generating the stereo signal.

While the impact on the CLD parameter is rather safe and harmless, the effect on the ICC parameter is typically perceived as an undesirable artifact. In the very important and common case of a mono speech signal which comprises additional side noise, the decreasing of the ICC parameter, i.e. the cross correlation of the left and right audio signals, yields an increased usage of the decorrelator in the upmix stage, which leads to an unnatural, wide, "reverby" voice, which is perceived as especially disturbing.

Figure 9A:
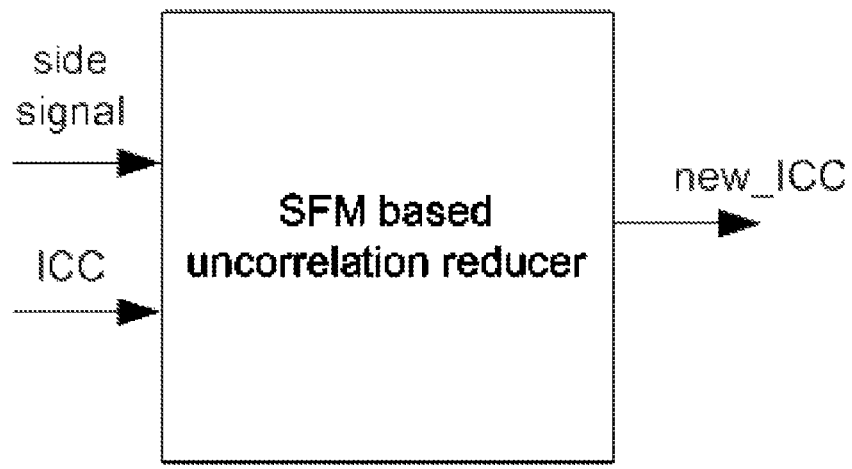
FIG. 9A illustrates an example noise compensation stage for compensating the ICC parameter.

As such a particular emphasis should be put on the noise compensation of the ICC parameter. The basic concept for generating a noise compensated ICC parameter is illustrated in FIG. 9A. An ICC parameter enters the noise compensation stage, wherein the input ICC parameter may correspond to the ICC parameter determined from the noisy left and right audio signals as outlined above. Furthermore, the side signal enters the compensation stage. The side signal is used to estimate the amount of side signal noise. Using the noise estimate, the ICC parameter is post-processed to compensate the noise and to provide a new ICC parameter new_ICC which may subsequently be used to re-generate the stereo signal.

Figure 9B:
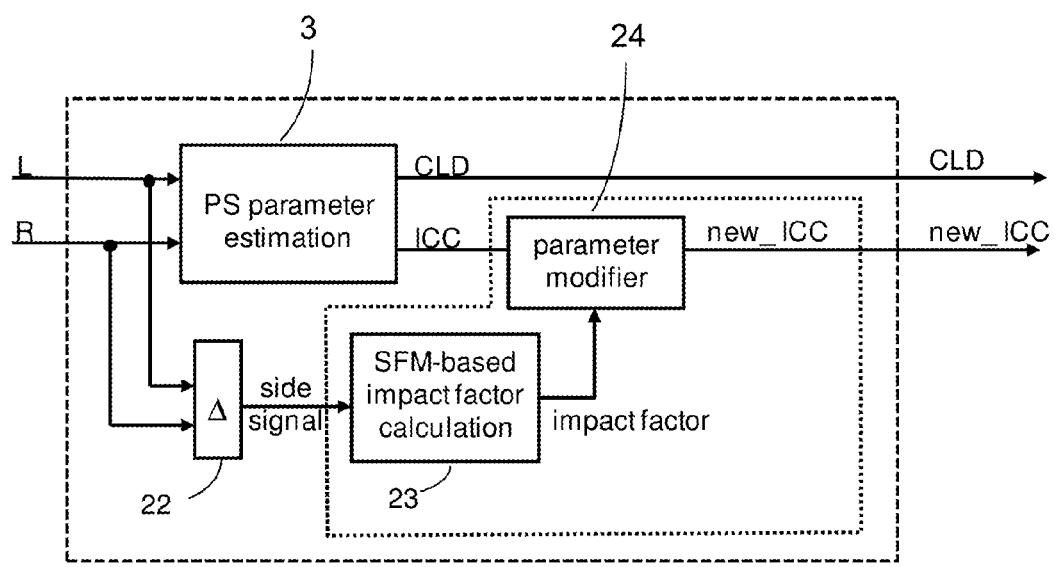
FIG. 9B illustrates an example noise compensation stage in more detail.

FIG. 9B illustrates an example system for generating a noise compensated ICC parameter in more detail. An ICC parameter is determined in PS parameter estimation stage 3 as outlined in the present document. The PS parameter estimation stage 3 may be configured to also determine other PS parameters such as a CLD parameter. If the two-channel audio signal is represented as a left and right audio signal, the system may comprise a side signal determination stage 22 configured to determine the side signal from the left and right audio signal. The side signal enters an impact factor determination stage 23 which makes use of the methods outlined in the present document to determine an impact factor based on the side signal. In particular, the impact factor may be determined based on the degree of noise in the side signal, e.g. based on the spectral flatness of the side signal. The impact factor and the ICC parameter determined in the PS parameter estimation stage 3 are input to a PS parameter modification stage 24 which is configured to determine a noise compensated ICC parameter according to a method outlined in the present document.

Figure 10:
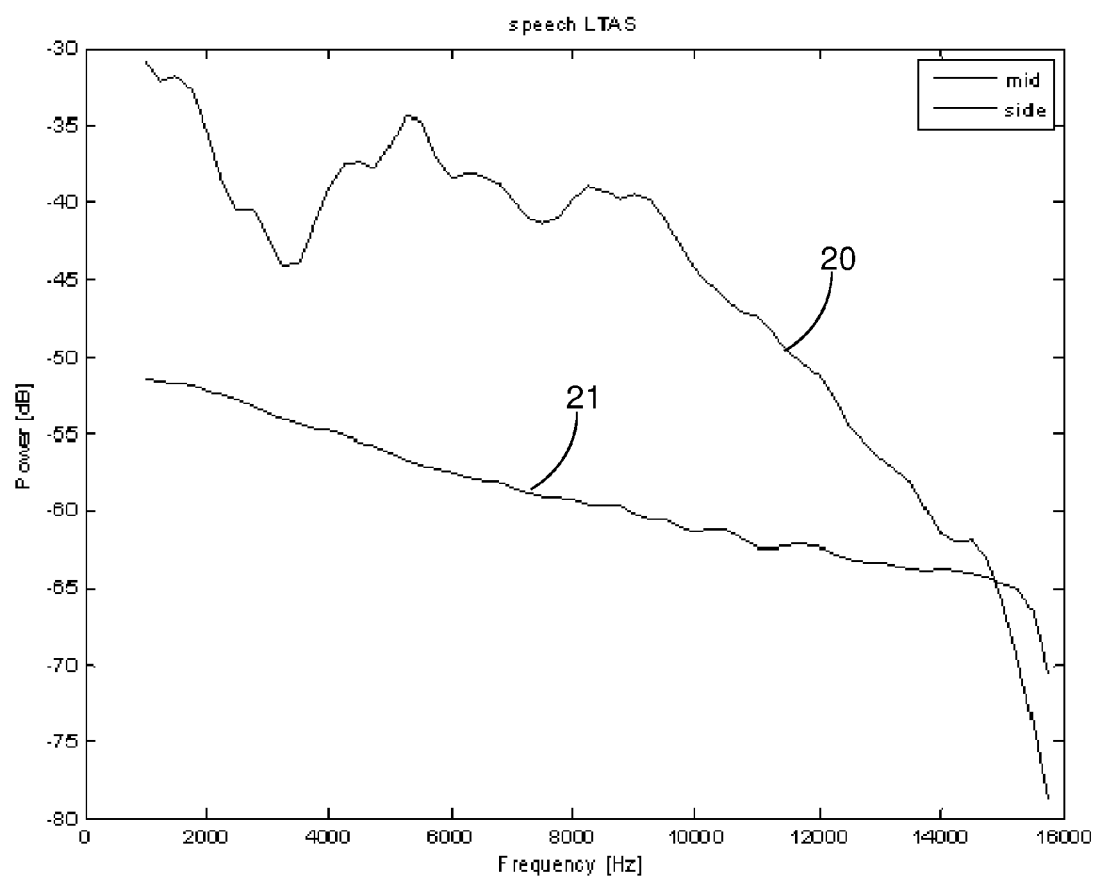
FIG. 10 illustrates the power spectrum for an example audio signal.

The side signal noise estimation may be based on a Spectral Flatness Measure (SFM). In FIG. 10, the power spectrum of the mid and side signal of a noisy speech signal is depicted. It can be seen that the power spectrum of the mid signal 20 is relatively steep with high levels of energy in the lower frequency range. On the other hand, the side signal 21, which in the illustrated case of a mono speech signal mainly comprises noise, has an overall low degree of energy and a relatively flat power spectrum.

Since the power spectrum of the side signal noise 21 is rather flat and has a characteristic slope, the SFM together with slope compensation may be used to estimate the noise level and to subsequently adjust the ICC values. Different types of SFM values may be used. I.e. the SFM values may be calculated in various manners. In particular, the instantaneous SFM value, as well as a smoothed version of the SFM may be used. The instantaneous SFM value typically corresponds to the SFM of a signal frame of the side signal, whereas the smoothed version of the instantaneous SFM value also depends on the SFM of previous signal frames of the side signal.

Figure 11:
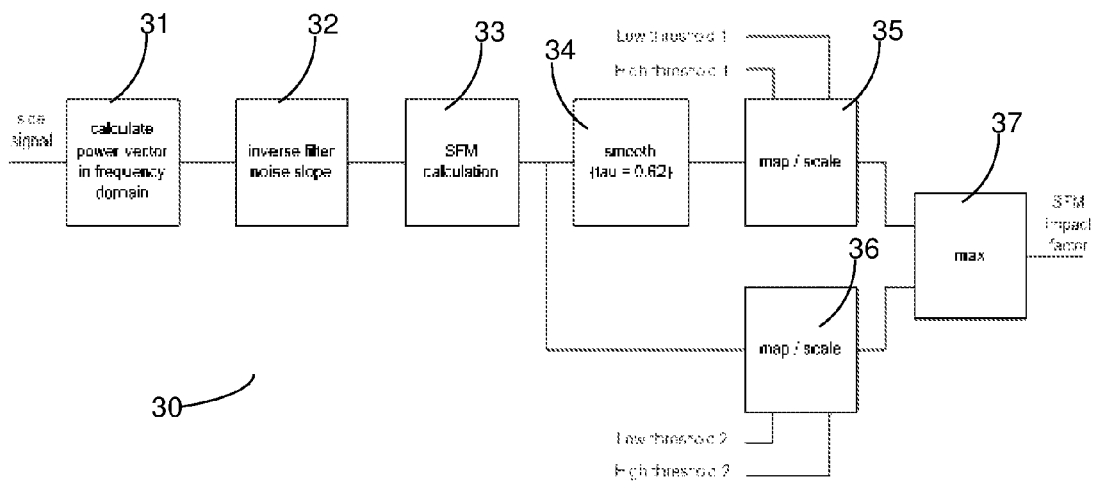
FIG. 11 shows an example process for determining an impact factor which may be used to compensate the ICC parameter.

In FIG. 11, the signal flow of the ICC compensation process 30 is depicted. In particular, a method 30 for determining an impact factor from the side signal is illustrated. The impact factor may be used to compensate the ICC parameter. In step 31 the power spectrum of the side signal is determined. Typically, this is done using a certain number of samples (e.g. the samples of a signal frame) of the side signal. The determination period of the power spectrum may be aligned with the period for determining PS parameters. As such, a power spectrum of the side signal may be determined for the validity period of the corresponding PS parameters, notably the ICC parameter.

In a subsequent step 32, the characteristic slope of the power spectrum 21 of side signal noise may be compensated. The characteristic slope may be determined experimentally (at a design/tuning phase), e.g. by determining the average power spectrum of the side signals of a set of mono signals. Alternatively or in addition, the characteristic slope may be determined adaptively from the current side signal, e.g. using linear regression on the power spectrum 21 of the current side signal. The compensation of the characteristic slope may be performed by an inverse noise slope filter. As a result, a slope compensated, possibly flat, power spectrum should be obtained, which does not exhibit the characteristic slope of the power spectrum of a side signal of a mono speech audio signal.

Using the (slope compensated) power spectrum, an SFM value is determined in step 33. The SFM may be calculated according to $$SFM = \frac{\left(\sum_{k=0}^{N-1} E\{X_s^2(k)\}\right)^{1/N}}{\frac{1}{N}\sum_{k=0}^{N-1} E\{X_s^2(k)\}}$$

wherein $E\{X_s^2(k)\}$ denotes the power of the side signal in the hybrid filterbank band k. The hybrid filterbank used in the example PS system consists of 64 QMF bands, where the 3 lowest bands are further divided into 4+2+2 bands (hence, N=64−3+4+2+2=69). The SFM may be described as the ratio between the geometric mean of the power spectrum and the arithmetic mean of the power spectrum.

Alternatively, the SFM may be calculated on a subset of the spectrum, only including the hybrid filterbank bands ranging from $K_{start}$ to $K_{stop}$. That way e.g. one or a few of the first bands can be excluded in order to remove an unwanted DC, e.g. low frequency, offset. When adjusting the band borders accordingly the SFM yields:

$$SFM = \frac{\left(\prod_{k=K_{start}}^{K_{stop}} E\{X_s^2(k)\}\right)^{1/(K_{stop}-K_{start}+1)}}{\frac{1}{(K_{stop}-K_{start}+1)}\sum_{k=K_{start}}^{K_{stop}} E\{X_s^2(k)\}}.$$

For reasons of limiting the computational complexity, the SFM formula may alternatively be replaced by numerical approximations of it based on e.g. a Taylor expansion, look-up table, or similar techniques commonly known for experts in the field of software implementations.

Furthermore, there are other obvious prior-art methods of measuring spectral flatness, such as e.g. the standard deviation or the difference between minimum and maximum of the frequency power bins, etc. Let hereby the term "SFM" denote any of these measures.

Using the SFM value for the particular time period or frame of the side signal, an impact factor can be determined. For this purpose, the SFM is mapped, e.g. onto a scale of 0 to 1, in the mapping block 36. The mapping and the determination of an SFM impact factor may be performed according to $$SFM\_impact\_factor = \begin{cases} 0, & SFM < \alpha_{low\_thresh} \\ \frac{SFM - \alpha_{low\_thresh}}{\alpha_{hi\_thresh} - \alpha_{low\_thresh}}, & \alpha_{low\_thresh} < SFM < \alpha_{high\_thresh} \\ 1, & SFM > \alpha_{high\_thresh} \end{cases}$$

wherein the two threshold values $\alpha_{low\_thresh}$ and $\alpha_{high\_thresh}$ are selected in accordance to the average range of SFM values which are typically ranging from 0.2 to 0.8. The main purpose of the normalization stage 36 is to ensure that the SFM impact factor regularly spans the complete region between "0" and "1". As such, the normalization ensures that a "normal" unflat spectrum (SFM<$\alpha_{low\_thresh}$) is not detected as noise and that the measure saturates for high values (SFM>$\alpha_{high\_thresh}$). In other words, the normalization provides an impact factor which more clearly distinguishes between high noise situations (SFM>$\alpha$high$_{thresh}$) and low noise situations (SFM<$\alpha_{low\_thresh}$).

In a parallel branch, a second SFM impact factor may be determined based on a smoothed version of the SFM value. The smoothed version of the current SFM value is determined in step 34. The smoothening operation may e.g. be performed recursively, where the current smoothed SFM value is determined from an average of the previous smoothed SFM value and the current instantaneous SFM value. In order to determine the average, the previous smoothed SFM may be weighted by the coefficient $\alpha$ (e.g. $\alpha$=0.95) and the current instantaneous SFM value may be weighted by (1-$\alpha$). As such, the smoothed SFM value can be determined recursively from the current instantaneous SFM value using the formula: SFM$_{smooth}$(n)=(1-$\alpha$)*SFM(n)+$\alpha$*SFM$_{smooth}$(n-1) The coefficient, $\alpha$ can be derived from e.g. the time constant, $\tau$=0.62 according to $\alpha$=exp(-1/($\tau$*samplingRate/update-Rate)), where in this example the sampling rate is 32 kHz and the update rate is every 1024 samples.

Eventually, the current smoothed SFM value may be mapped in step 35 in a similar manner as outlined in the context of step 36. However, the threshold values $\alpha_{low\_thresh}$ and $\alpha_{high\_thresh}$, which are used to map the smoothed SFM value to determine a second SFM impact factor, are typically different from the ones used for the non-smoothed SFM values. In an example, the threshold values range between 0.5 and 0.7 for the smoothed SFM values.

The smoothed SFM values typically detect stable static noise, while the non-smoothed SFM values use higher thresholds for detecting short noise bursts. As such, a combination of both can be used to detect stable static noise, as well as short noise bursts. For this purpose, one of the two SFM impact factors is selected for compensating the ICC parameter. This is performed in step 37. In the illustrated example, the maximum value of the two SFM impact factors is selected, thereby implementing a conservative approach with a highest possible reduction of decorrelation. Alternatively, a weighted sum of both SFM impact factors (the smoothed factors and the non-smoothed factors) may be used as the resulting SFM impact factor.

The resulting SFM impact factor is then applied to the ICC values according to:

ICC_new=(SFM_impact_factor)+(1-SFM_impact_factor)*ICC.

As outlined above, the SFM impact factor is mapped onto a range of "0" to "1", wherein "0" corresponds to a low SFM value indicating a power spectrum of the side signal where the spectral power is concentrated in a relatively small number of frequency bands. I.e. an SFM impact factor of "0" indicates a low level of noise, such that the estimated ICC parameter should be retained. On the other hand, an SFM impact factor of "1" corresponds to a high SFM value indicating that the spectrum has a similar amount of power in all spectral bands. Consequently, an SFM impact factor of "1" indicates a high level of noise, such that the ICC parameter should be strongly compensated. As a matter of fact, if the side signal only comprises noise, the ICC parameter should be forced to "1", i.e. the ICC parameter should be forced to indicate no decorrelation, i.e. to full cross-correlation. This is performed by the above formula for determining a noise compensated ICC parameter "ICC_new" from the originally estimated ICC parameter "ICC" and the SFM impact factor.

Other transformation functions can be used to determine a noise compensated ICC parameter from the originally estimated ICC parameter and from the SFM impact factor. In general terms, it may be stated that ICC_new=f(SFM_impact_factor, ICC), wherein f( ) is a function which is "0" for an SFM_impact_factor=0 and which is "1" for an SFM_impact_factor=1. In between these to values, the function f( ) is a pre-defined function which allows for a mapping of possible values of ICC and SFM_impact_factor to a corresponding value of ICC_new.

Figure 12:
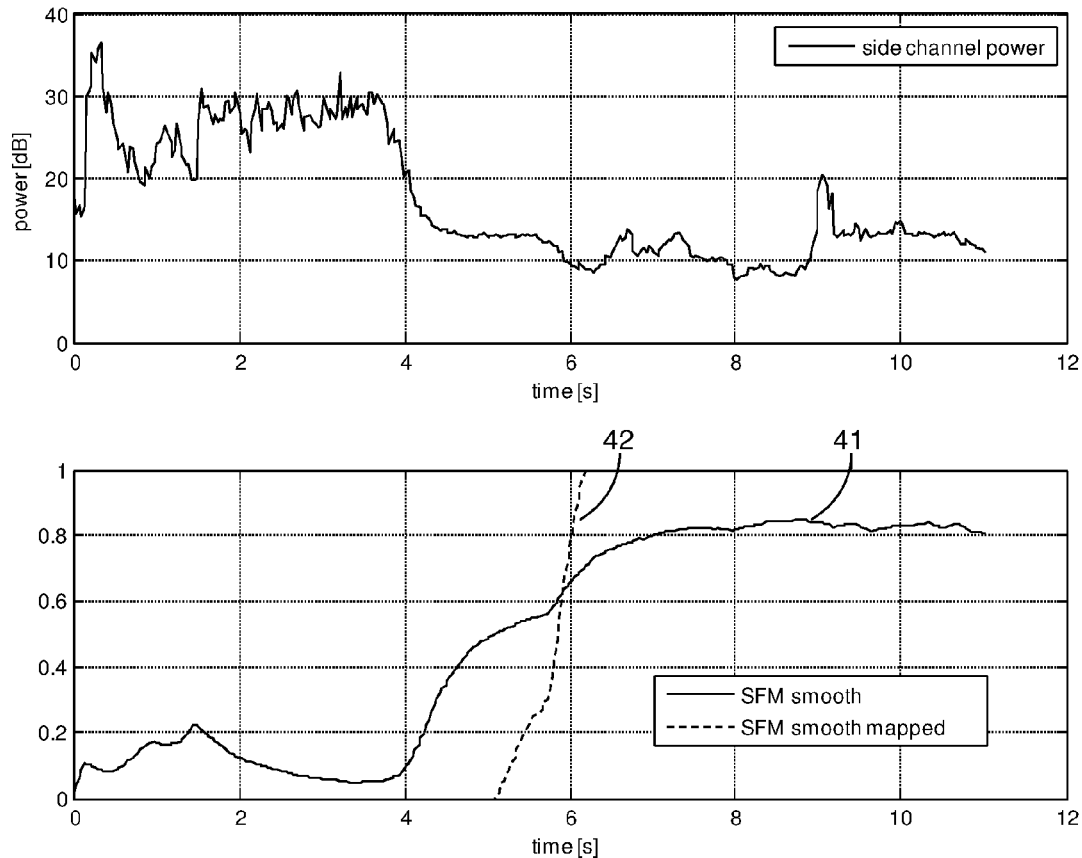
FIG. 12 shows the smoothed Spectral Flatness Measure and its corresponding impact factor for an example audio signal transiting from a stereo music section to a mono speech section.

The plots in FIG. 12 clearly illustrate the above mentioned functionality of the SFM impact factor. In the upper plot a side signal of an example audio signal is depicted. The first half of the audio signal contains the end of a classical (opera) music piece in stereo. The second half contains mono speech with only noise in the side signal. The lower plot shows the corresponding sequence of smoothed SFM values 41 and the corresponding sequence of SFM impact factors 42 (referred to as "SFM smooth mapped" in FIG. 12). The smoothed SFM values 41 indicate whether the side signal contains noise or not. After the mapping in step 35, i.e. in this case after mapping the SFM value region [0.5, 0.7] to the SFM impact factor region [0, 1], the SFM impact value 42 takes on values between 0 and 1 and shows a clear transition between the "low noise" situation and the "high noise" situation. For SFM values 41 lower than 0.5 the SFM impact value 42 is "0", whereas for SFM values 41 greater than 0.7, the SFM impact value 42 is "1". As such, the SFM impact value 42 ensures that the ICC parameters are untouched during the first part of the audio signal (stereo music). On the other hand, the SFM impact value 42 forces to shut down the decorrelation at the second part of the audio signal (mono speech).

The concept of compensating the noise of the side signal comprised within parametric stereo parameters has been outlined in the context of the inter-channel cross-correlation parameter ICC. It should be noted that other alternative parametric stereo (PS) parameterizations exists, i.e. other sets of PS parameters than CLD and ICC. The concept of noise compensation outlined in the present document may also be applied to such alternative PS parameterizations. In particular, the noise compensation may be applied to the PS parameter which impacts the amount of decorrelation applied during the upmix stage in order to generate an output stereo signal.

An example for an alternative PS parameterization can be illustrated by the following upmix process:

$$S = a*DM + g*\text{decorr}(DM), L' = DM + S, R' = DM - S,$$

where DM is the downmix signal, "a" and "g" are the two new PS parameters, and decorr( ) is the decorrelator, typically an all-pass filter, used in the upmix stage.

While it is typically possible to calculate the parameters "a" and "g" from "CLD" and "ICC", it is also possible to apply an SFM-controlled parameter modification, i.e. a noise compensation as outlined in the present document, to reduce unwanted decorrelation directly to the alternative PS parameter "g" which determines the amount of decorrelation added in the upmix process. In this case, the processing in the impact factor determination stage 23 of FIG. 9B and in the PS parameter modification stage 24 of FIG. 9B would have to be adapted accordingly, while the general principle of operation of noise compensation remains the same. In particular, one might use a different mapping function to derive the SFM_impact_factor from the SFM, and the parameter modification could be based on the function:

$$g\_new = (1 - SFM\_impact\_factor) * g,$$

i.e., an SFM_impact_factor=1 would force g_new=0. This, similar to ICC=1, means that no decorrelation is added during the upmix stage. For an SFM_impact_factor=0, g would remain unchanged.

As such, it should be noted that the concept of noise compensation outlined in the present document may be applied to various forms of PS parameterizations. In particular, the concepts may be used to adjust the PS parameter or PS parameters which affect the amount of decorrelation that is applied to generate an output stereo signal.

The concepts discussed herein can be implemented in connection with any encoder using PS techniques, e.g. an HE-AAC v2 (High-Efficiency Advanced Audio Coding version 2) encoder as defined in the standard ISO/IEC 14496-3 (MPEG-4 Audio), an encoder based on MPEG Surround or an encoder based on MPEG USAC (Unified Speech and Audio coder) as well as encoders which are not covered by MPEG standards.

In the following, by way of example, a HE-AAC v2 encoder is assumed; nevertheless, the concepts may be used in connection with any audio encoder using PS techniques.

HE-AAC is a lossy audio compression scheme. HE-AAC v1 (HE-AAC version 1) makes use of spectral band replication (SBR) to increase the compression efficiency. HE-AAC v2 further includes parametric stereo to enhance the compression efficiency of stereo signals at very low bitrates. An HE-AAC v2 encoder inherently includes a PS encoder to allow operation at very low bitrates. The PS encoder of such an HE-AAC v2 encoder can be used as the PS encoder 7 of the audio processing apparatus 2. In particular, the PS parameter estimating stage within a PS encoder of an HE-AAC v2 encoder can be used as the PS parameter estimating stage 3 of the audio processing apparatus 2. Also the downmix stage within a PS encoder of an HE-AAC v2 encoder can be used as the downmix stage 9 of the apparatus 2.

Figure 13:
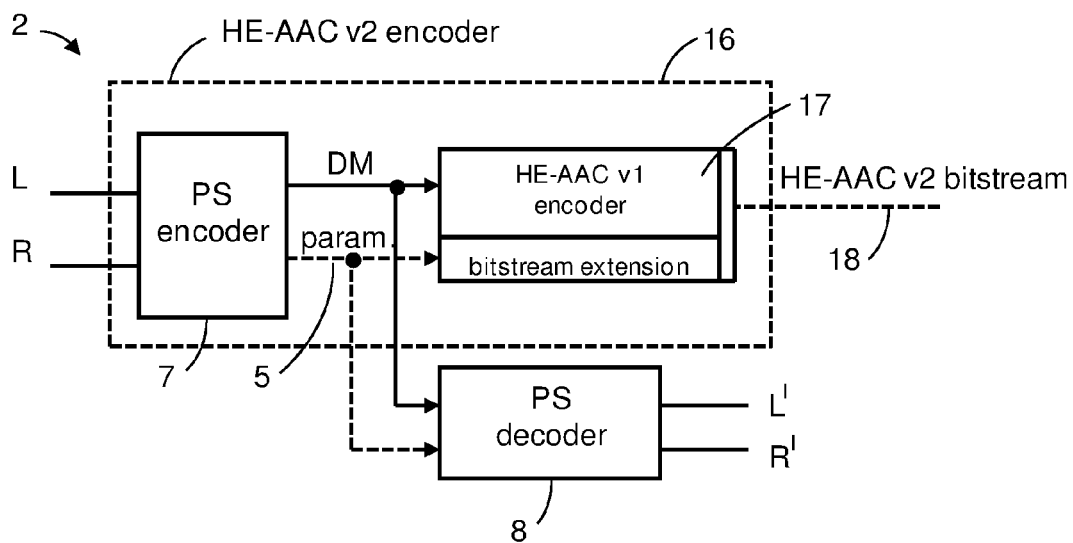
FIG. 13 illustrates a further embodiment of the audio processing apparatus based on an HE-AAC v2 encoder.

Hence, the concept discussed in this specification can be efficiently combined with an HE-AAC v2 encoder to realize an improved FM stereo radio receiver. Such an improved FM stereo radio receiver may have an HE-AAC v2 recording feature since the HE-AAC v2 encoder outputs an HE-AAC v2 bitstream which can stored for recording purposes. This is shown in FIG. 13. In this embodiment, the apparatus 2 comprises an HE-AAC v2 encoder 16 and the PS decoder 8. The HE-AAC v2 encoder provides the PS encoder 7 used for generating the mono downmix DM and the PS parameters 5 as discussed in connection with the previous drawings.

Optionally, the PS encoder 7 may be modified for the purpose of FM radio noise reduction to support a fixed downmix scheme, such as a downmix scheme according to DM=(L+R)/a.

The mono downmix DM and the PS parameters 8 may be fed to the PS decoder 8 to generate the stereo signal L', R' as discussed above. The mono downmix DM is fed to an HE-AAC v1 encoder for perceptual encoding of the mono downmix DM. The resulting perceptual encoded audio signal and the PS information are multiplexed into an HE-AAC v2 bitstream 18. For recording purposes, the HE-AAC v2 bitstream 18 can be stored in a memory such as a flash-memory or a hard-disk.

The HE-AAC v1 encoder 17 comprises an SBR encoder and an AAC encoder (not shown). The SBR encoder typically performs signal processing in the QMF (quadrature mirror filterbank) domain and thus needs QMF samples. In contrast, the AAC encoder typically needs time domain samples (typically downsampled by a factor 2).

The PS encoder 7 within the HE-AAC v2 encoder 16 typically provides the downmix signal DM already in the QMF domain.

Since the PS encoder 7 may already send the QMF domain signal DM to the HE-AAC v1 encoder, the QMF analysis transform in the HE-AAC v1 encoder for the SBR analysis can be made obsolete. Thus, the QMF analysis that is normally part of the HE-AAC v1 encoder can be avoided by providing the downmix signal DM as QMF samples. This reduces the computing effort and allows for complexity saving.

The time domain samples for the AAC encoder may be derived from the input of the apparatus 2, e.g. by performing the simple operation DM=(L+R)/2 in the time domain and by downsampling the time domain signal DM. This approach is probably the cheapest approach. Alternatively, the apparatus 2 may perform a half-rate QMF synthesis of the QMF domain DM samples.

In the present document, a method and system for reducing the noise of FM radio receivers has been described. PS parameters are determined from the received mid and side signal to generate a noise reduced audio signal using the mid signal and the PS parameters. In order to reduce the impact of noise on the estimated PS parameters, a noise estimation and compensation method has been described.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the internet. Typical devices making use of the methods and systems described in the present document are portable electronic devices or other consumer equipment which are used to store and/or render audio signals.

The invention claimed is:

1. A system configured to determine a parametric stereo parameter from a received two-channel audio signal, the system comprising:
a noise estimation stage configured to determine an impact factor characteristic for the noise of a side signal obtained from the two-channel audio signal, based on the side signal;
a parametric stereo parameter estimation stage configured to determine the parametric stereo parameter; wherein the determining is based on the two-channel audio signal and the impact factor; and wherein the determining involves compensating an error of the parametric stereo parameter resulting from the noise of the side signal, using the impact factor; and
one or more processors configured to perform the noise estimation stage or the parametric stereo parameter estimation stage.

2. The system of claim 1, wherein the two-channel audio signal is presentable as a mid signal and the side signal, representative of a corresponding left and right audio signal.

3. The system of claim 1 further comprising:
an upmix stage configured to generate an output stereo signal based on an auxiliary audio signal and the parametric stereo parameter; wherein the auxiliary audio signal is obtained from the two-channel audio signal.

4. The system of claim 1, wherein the parametric stereo parameter affects an amount of decorrelation that is applied for the generation of a stereo signal based on the two-channel audio signal.

5. The system of claim 1, wherein
the impact factor is characteristic of the spectral flatness of the side signal.

6. The system of claim 5, wherein the parametric stereo parameter estimation stage is configured to
determine a noisy parametric stereo parameter using samples of a first signal frame of the two-channel audio signal; and
determine the parametric stereo parameter by modifying the noisy parametric stereo parameter using the impact factor.

7. The system of claim 6, wherein the parametric stereo parameter estimation stage is configured to
modify the noisy parametric stereo parameter such that the amount of decorrelation that is applied for the generation of a stereo signal is reduced, if the impact factor indicates a high degree of spectral flatness of the side signal.

8. The system of claim 6, wherein the parametric stereo parameter estimation stage is configured to determine the parametric stereo parameter from a function depending on the noisy parametric stereo parameter and the impact factor.

9. The system of claim 1, wherein the parametric stereo parameter is an inter-channel cross-correlation parameter indicative of the correlation between the two-channel audio signal.

10. The system of claim 9, wherein
the inter-channel cross-correlation parameter covers a range of "−1" to "1";
the inter-channel cross-correlation value "0" indicates no cross-correlation between the left and right channel;
the inter-channel cross-correlation value "1" indicates full cross-correlation between the left and right channel;
the inter-channel cross-correlation value "−1" indicates negative full cross-correlation between the left and right channel;
the impact factor covers a range of "0" to "1";
the impact factor value "0" indicates a low degree of flatness; and
the impact factor value "1" indicates a high degree of flatness.

11. The system of claim 10, wherein the parametric stereo parameter estimation stage is configured to determine the inter-channel cross-correlation parameter ICC_new from the noisy inter-channel cross-correlation parameter ICC using the function: ICC_new=(impact factor)+(1−impact factor)*ICC.

12. The system of claim 1, wherein the noise estimation stage is configured to
calculate a power spectrum of a second signal frame of the side signal;
compensate a slope of the power spectrum, thereby yielding a compensated power spectrum; and
determine a spectral flatness measure, referred to as SFM, value of the compensated power spectrum.

13. The system of claim 12, wherein the SFM value is determined as the ratio between the geometric mean of the compensated power spectrum and the arithmetic mean of the compensated power spectrum.

14. The system of claim 12, wherein the noise estimation stage is configured to
map the SFM value; and
determine a first impact factor based on the mapped SFM value.

15. The system of claim 14, wherein the noise estimation stage is configured to map the first impact factor to a range of "0" to "1".

16. The system of claim 15, wherein the noise estimation stage is configured to
set the first impact factor to "0" for an SFM value below a first lower threshold;
set the first impact factor to "1" for an SFM value above a first higher threshold; and
scale an SFM value from the first lower threshold to the first higher threshold to the range "0" to "1".

17. The system of claim 12, wherein the noise estimation stage is configured to
determine a smoothed SFM value by taking into account a plurality of SFM values corresponding to a plurality of signal frames of the side signal;
map the smoothed SFM value; and
determine a second impact factor based on the mapped smoothed SFM value.

18. An FM stereo radio receiver configured to receive an FM radio signal comprising a mid signal and a side signal and comprising a system according to claim 1.

19. A method for determining a parametric stereo parameter from a received two-channel audio signal, the method comprising:
- determining an impact factor characteristic for the noise of a side signal obtained from the two-channel audio signal, based on the side signal; and
- determining the parametric stereo parameter; wherein the determining is based on the two-channel audio signal and the impact factor; and wherein the determining involves compensating an error of the parametric stereo parameter resulting from the noise of the side signal, using the impact factor;
- wherein the method is performed with one or more computing devices.

20. A non-transitory computer readable medium comprising a software program adapted for execution on a processor and for performing the method steps of claim 19 when carried out on a computing device.

* * * * *